Feb. 14, 1950 H. S. MINSTER 2,497,787
BURNER ASSEMBLY
Filed May 1, 1945 9 Sheets-Sheet 2
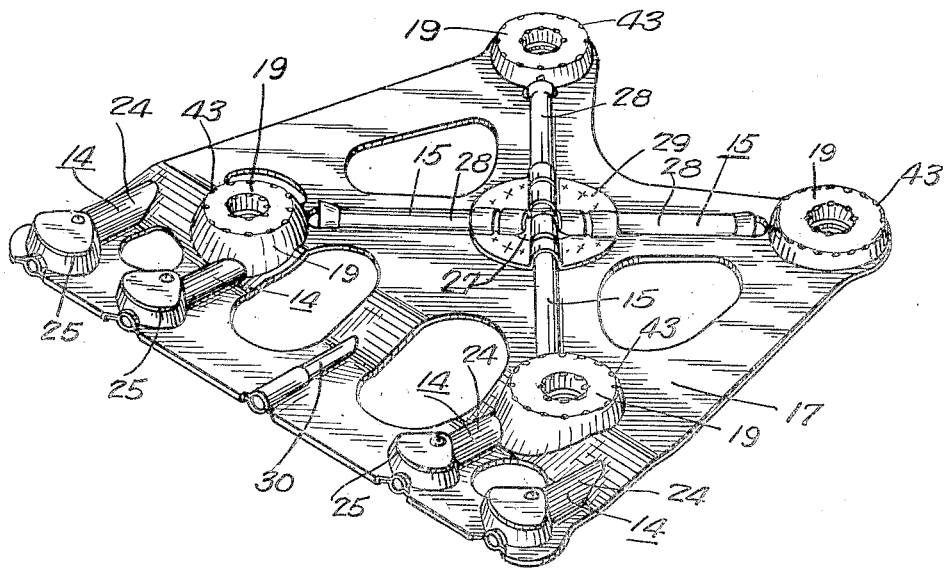
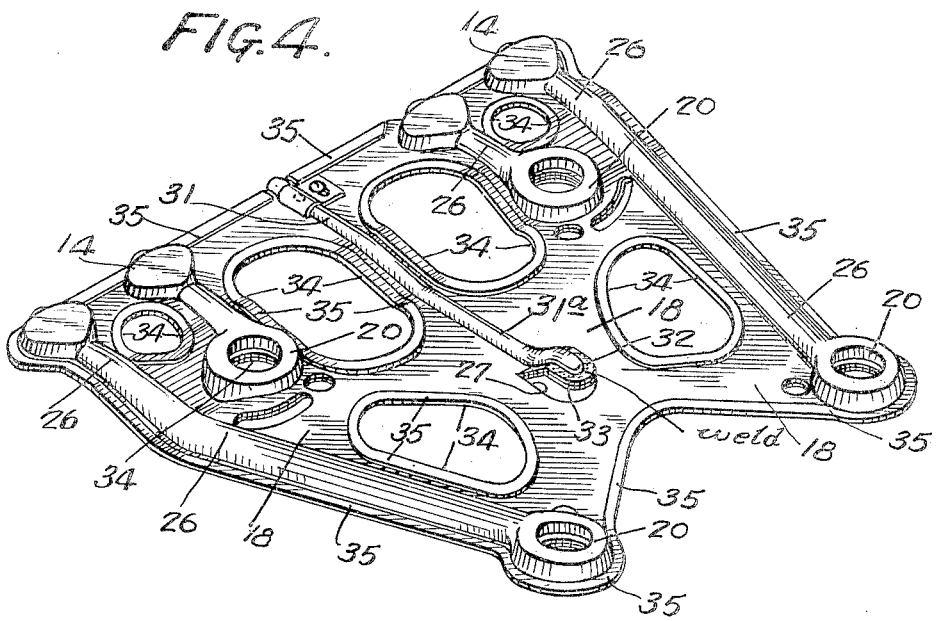
Inventor:—
Henry S. Minster
by his Attorneys
Howson & Howson

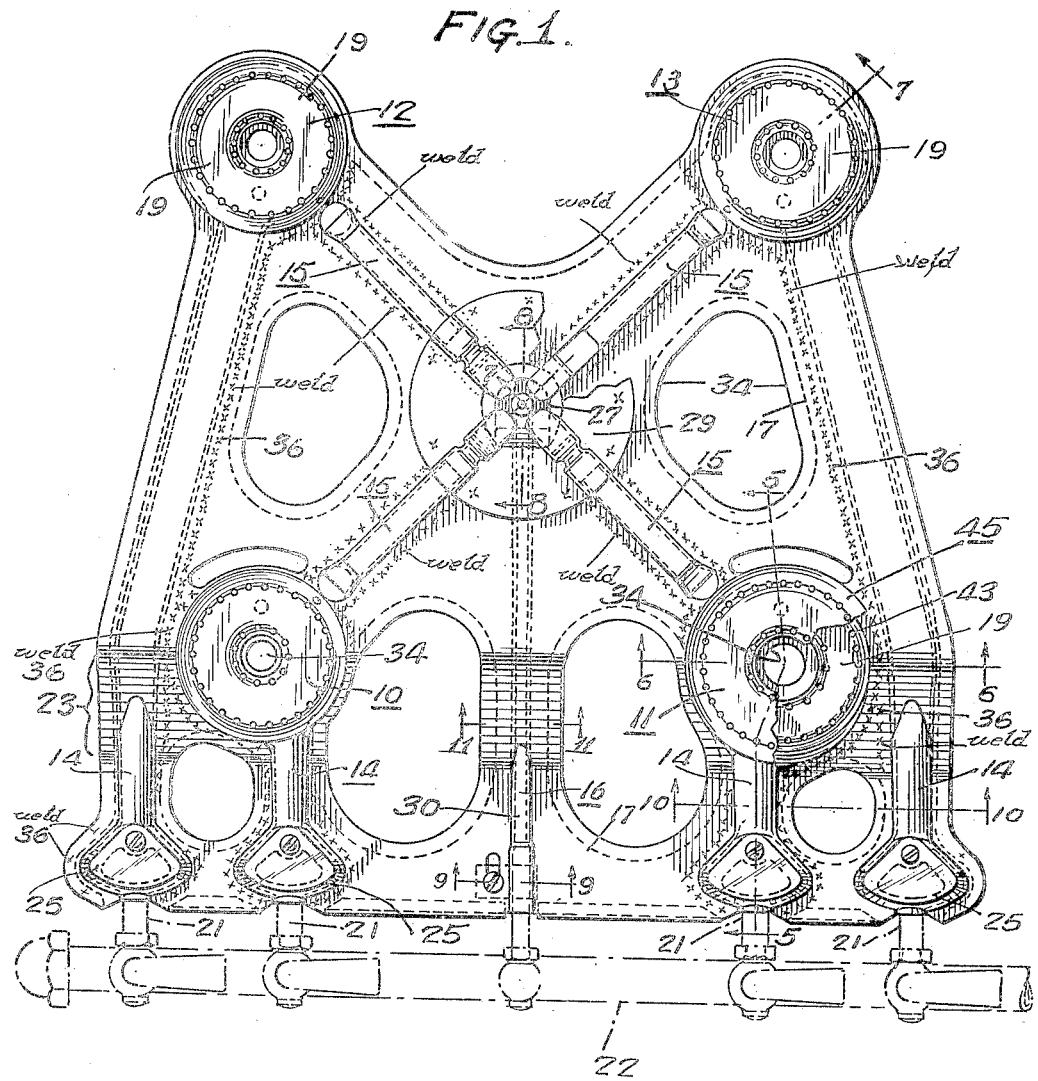
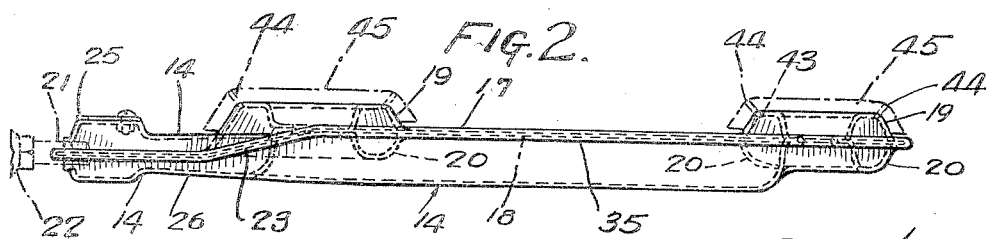

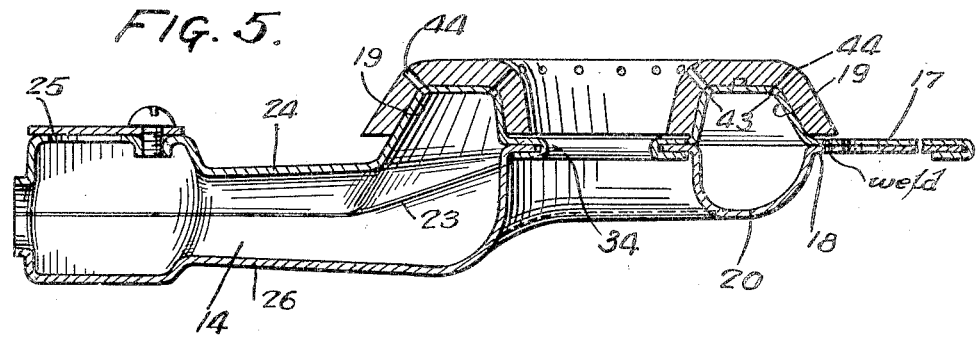
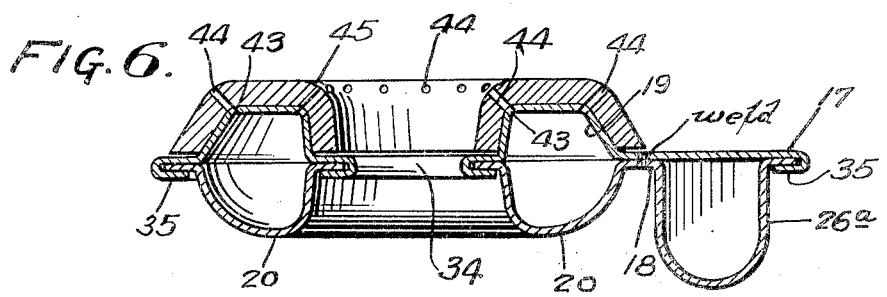
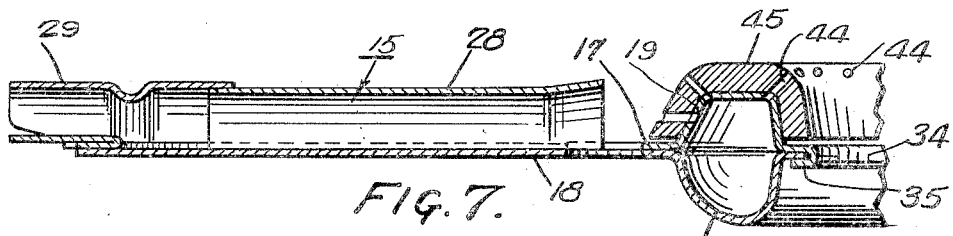
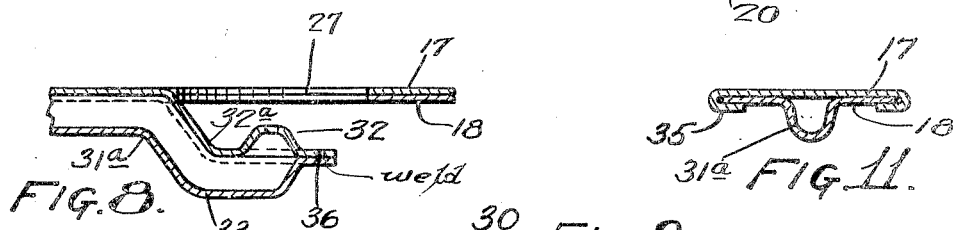
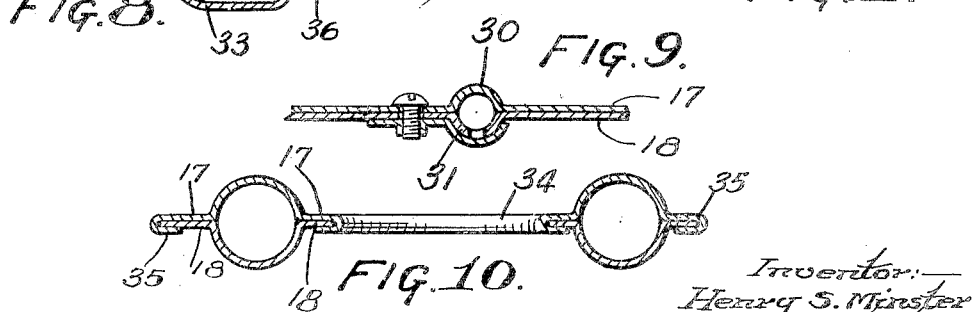

Feb. 14, 1950        H. S. MINSTER        2,497,787
BURNER ASSEMBLY

Filed May 1, 1945                                9 Sheets-Sheet 5

Inventor:—
Henry S. Minster
by his Attorneys
Howson & Howson

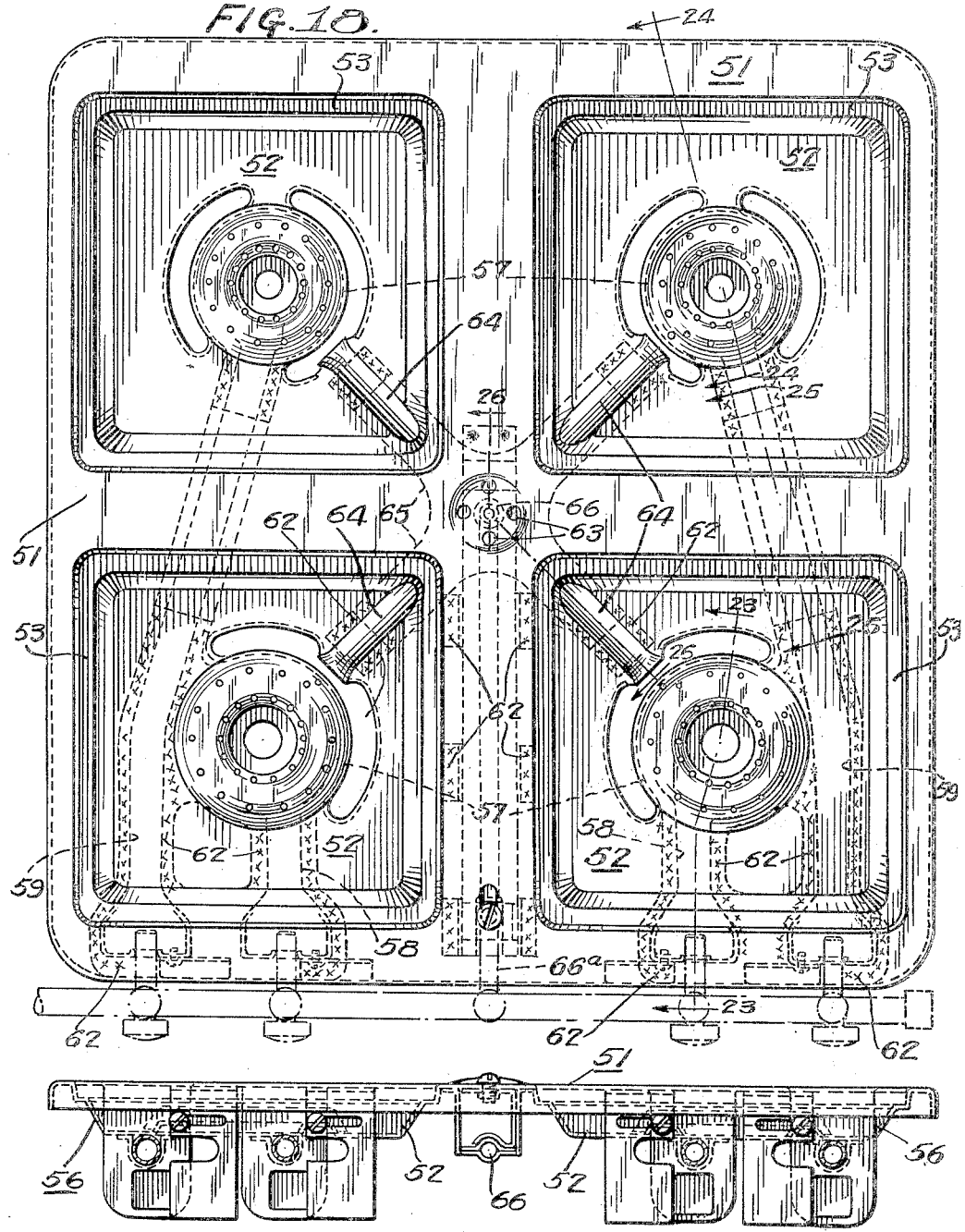

Feb. 14, 1950     H. S. MINSTER     2,497,787
BURNER ASSEMBLY
Filed May 1, 1945                                9 Sheets-Sheet 7
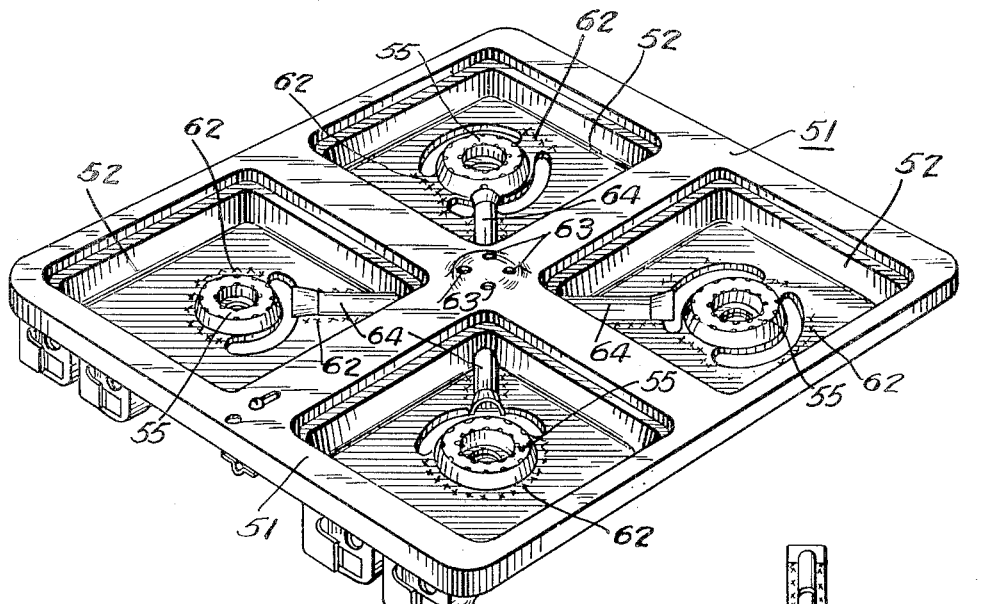
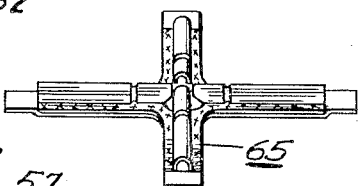
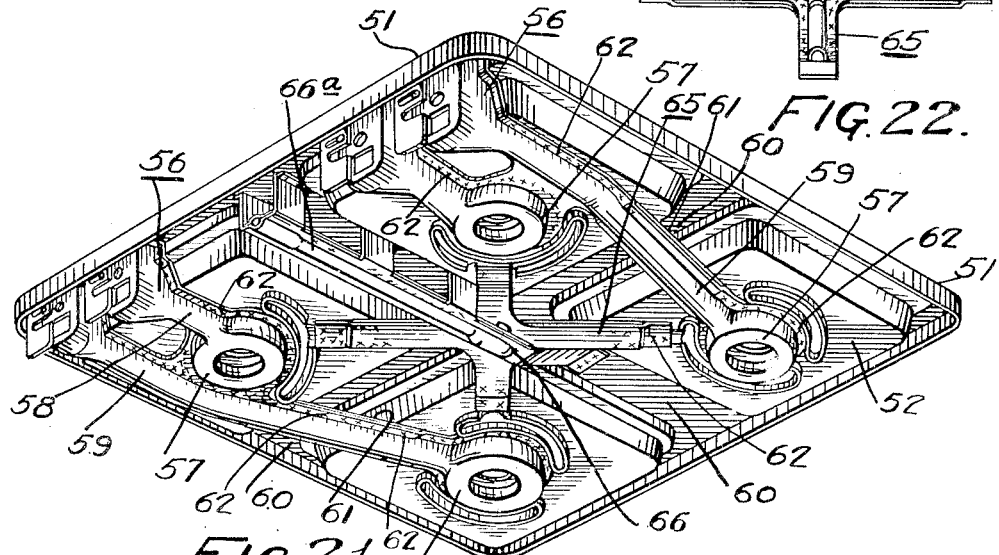
Inventor:—
Henry S. Minster
by his Attorneys
Howson & Howson Feb. 14, 1950     H. S. MINSTER     2,497,787
BURNER ASSEMBLY Filed May 1, 1945     9 Sheets-Sheet 9

Inventor:—
Henry S. Minster
by his Attorneys
Howson + Howson

Patented Feb. 14, 1950

2,497,787

UNITED STATES PATENT OFFICE 2,497,787

BURNER ASSEMBLY

Henry S. Minster, Rosemont, Pa., assignor to Roberts & Mander Corporation, a corporation of Delaware Application May 1, 1945, Serial No. 591,247

11 Claims. (Cl. 158—115)

This invention relates to a burner assembly for domestic gas ranges, and more particularly to the provision of a construction wherein the multiple burners of such a range are conveniently formed as a unit.

In the usual domestic gas range, the burners are individually formed and supported, being used generally as castings. This arrangement leads to considerable difficulty in manipulation since the burners must be individually handled in cleaning, and furthermore leads to inefficiency in operation due to the fact that in returning the burners to their individual supports, one or more of the burners is often inaccurately positioned with the result that it will not properly associate itself with the pilot.

In accordance with my invention, the multiple burners of such a range are formed as a unit and are of such light construction that they are easily handled as an entirety in cleaning operations. The construction embodies either an integrally attached pilot unit or means whereby the pilot tube may be accurately associated with the unit so that removal and restoration of the unit will not result in inaccurate alignment and consequently inefficiency. To this end, an important object of the invention is the construction of the assembly from complementary sheets suitably embossed and secured together to provide the usual burner supply ducts and pilot passages.

Another object of the invention is the arrangement of these burners in such fashion that the assembly may be readily and cheaply produced.

A still further object of the invention is the provision of a construction of this character enabling one of the sheets of the assembly to serve as the stove top.

These and other objects I attain by the construction shown in the accompanying drawings wherein for the purpose of illustration I have shown a preferred embodiment of my invention and wherein:

Figure 1 is a plan view of a burner assembly for a domestic gas range constructed in accordance with my invention;

Fig. 2 is a side elevation thereof;

Fig. 3 is a perspective view of the upper surface of the assembly;

Fig. 4 is a perspective view of the lower surface of the assembly;

Figure 12:
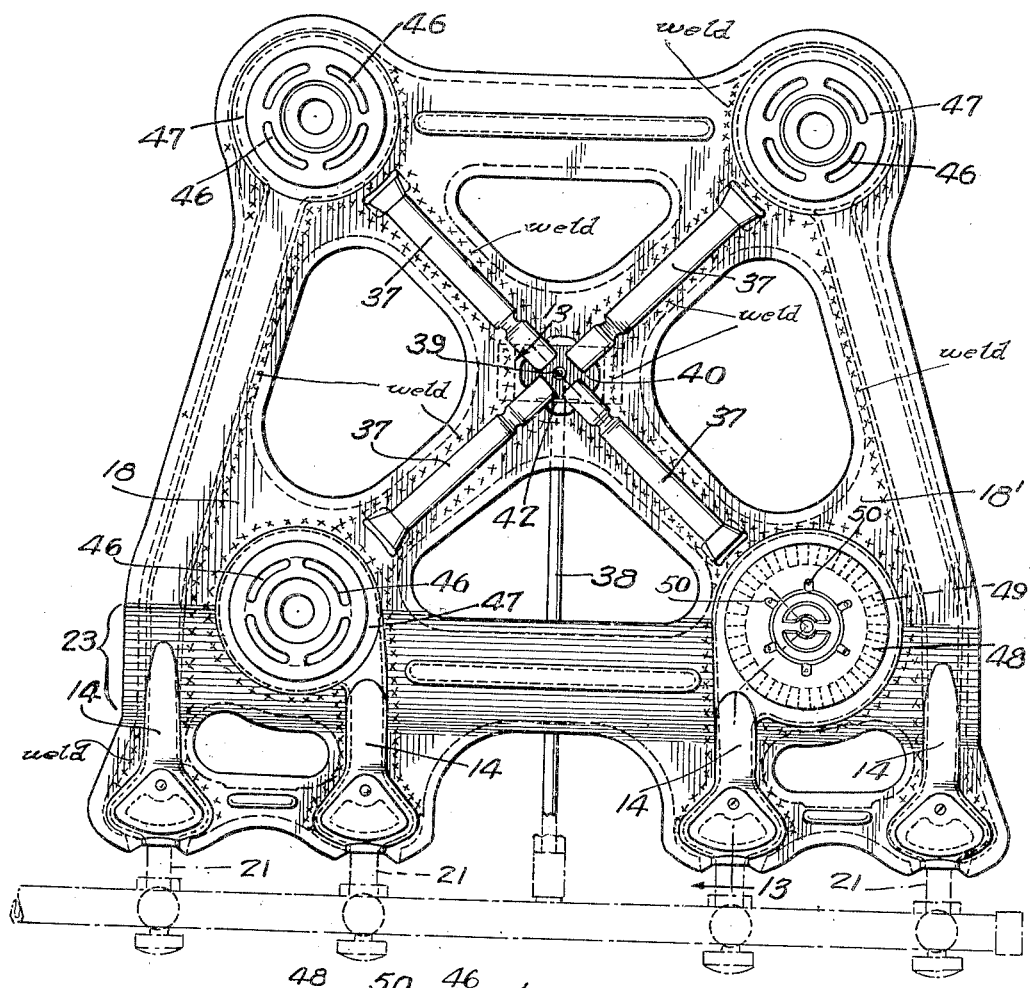
Figure 13:
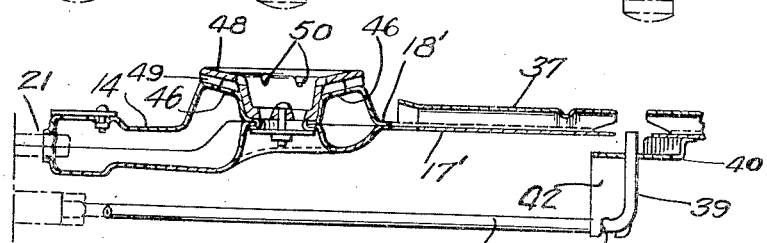
Figure 14:
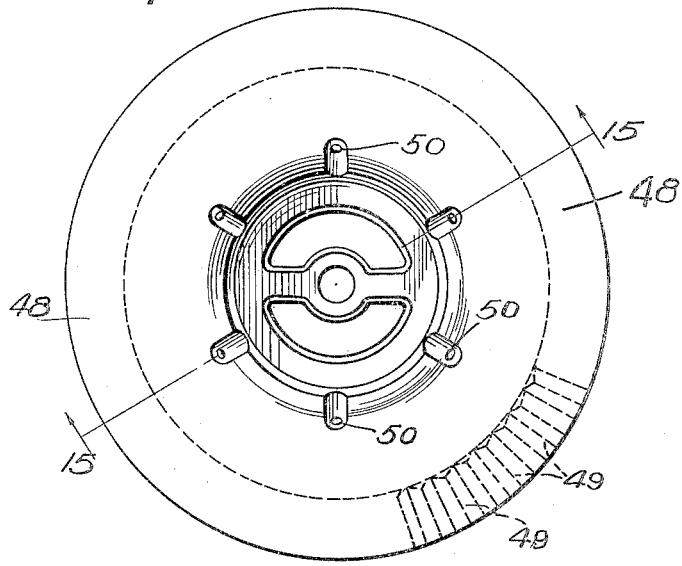
Figure 15:
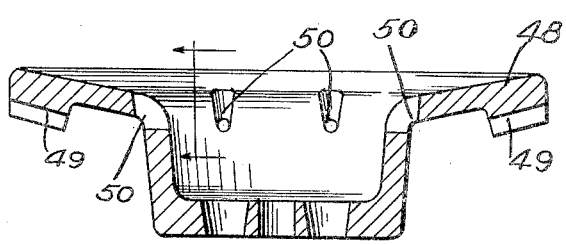
Figure 16:
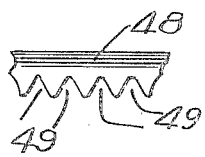
Figure 17:
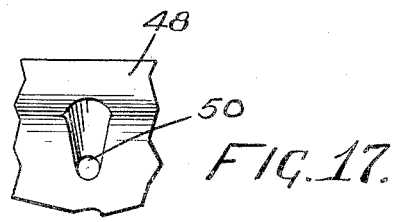
Figure 23:
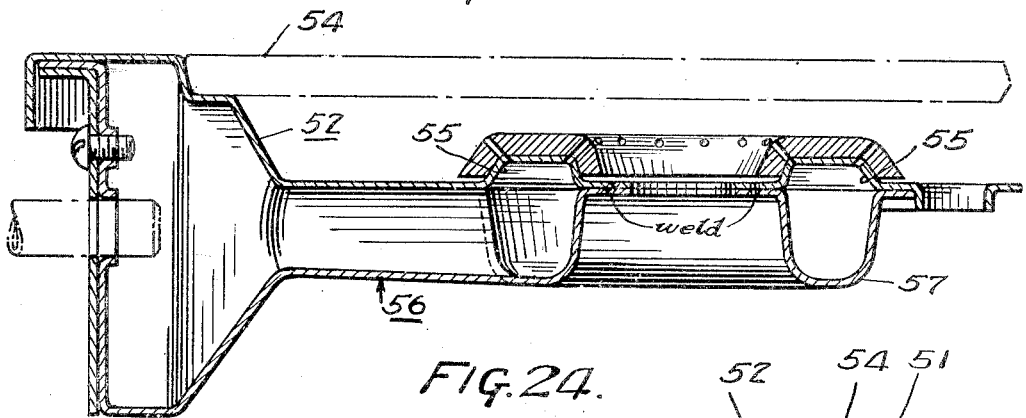
Figure 24:
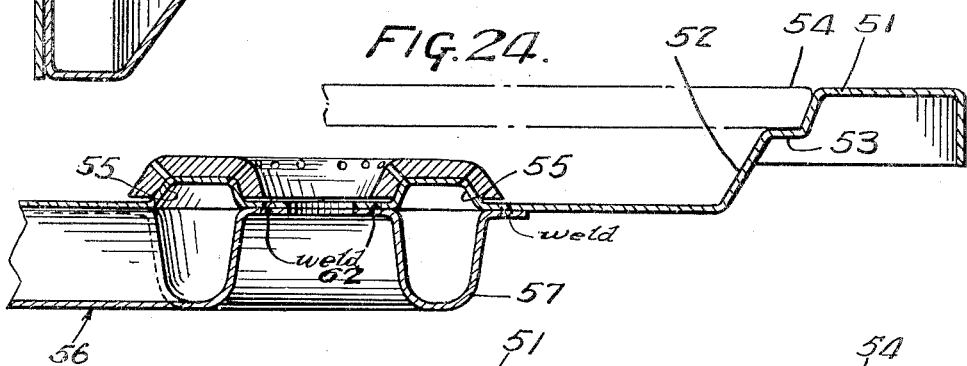
Figure 25:
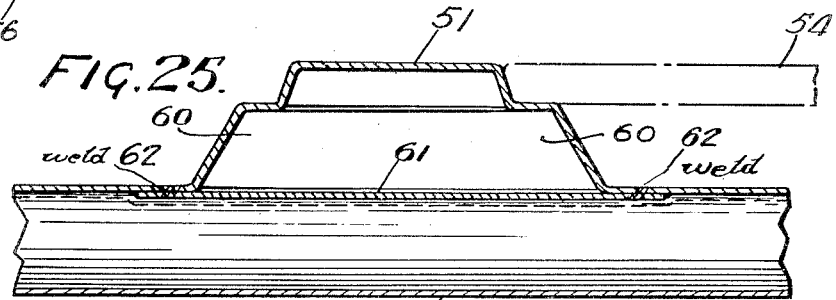
Figure 26:
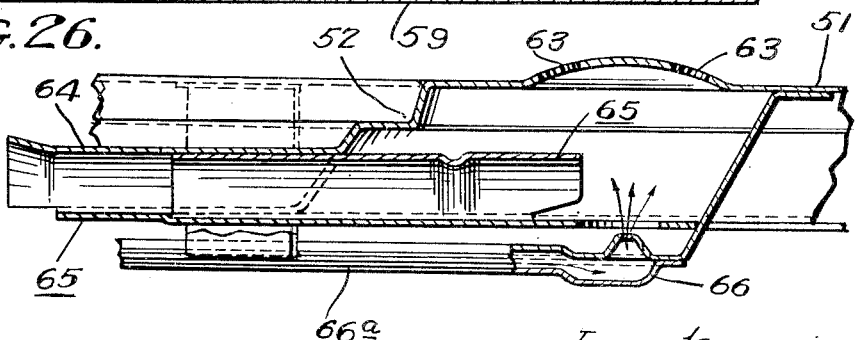

Figs. 5 to 11, inclusive, are enlarged sectional views on correspondingly indicated section lines of Fig. 1;

Fig. 12 is a plan view of a slightly modified form of burner assembly;

Fig. 13 is a section on line 13—13 of Fig. 12;

Fig. 14 is a plan view of a burner cap for use with burners of the character shown in Fig. 12;

Fig. 15 is a section on line 15—15 of Fig. 14;

Fig. 16 is a fragmentary edge elevation of the burner cap flange;

Fig. 17 is a fragmentary elevation of one of the burner ports;

Fig. 18 is a plan view of a construction wherein the assembly forms the stove top;

Fig. 19 is a front elevation thereof;

Fig. 20 is a top perspective view of the combined top and burner assembly;

Fig. 21 is a bottom perspective view thereof;

Fig. 22 is a perspective view of the igniter tube completing arrangement;

Figs. 23, 24, 25 and 26 are sections on correspondingly numbered section lines of Fig. 18.

Figure 27:
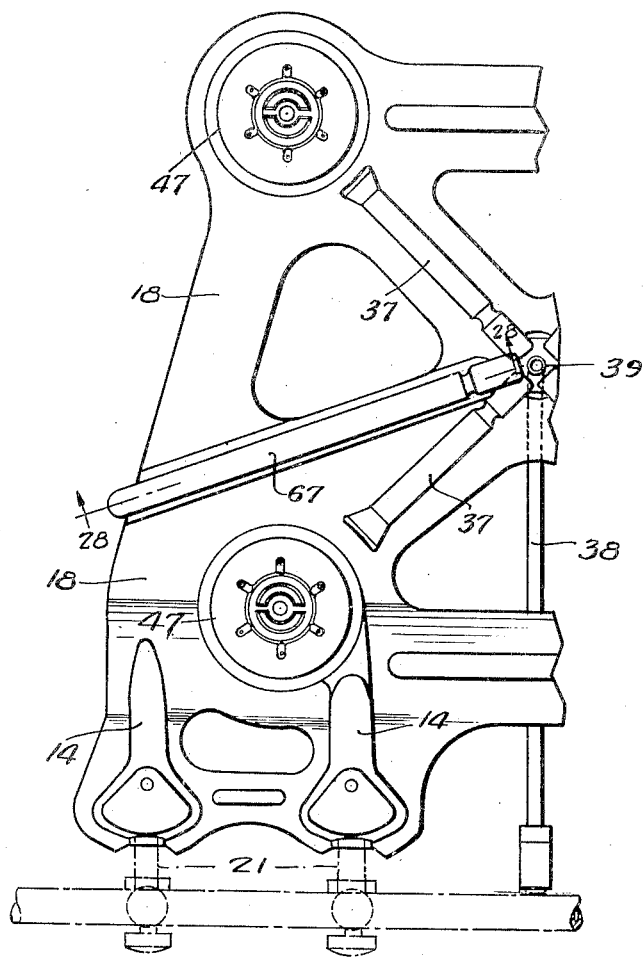
Figure 28:
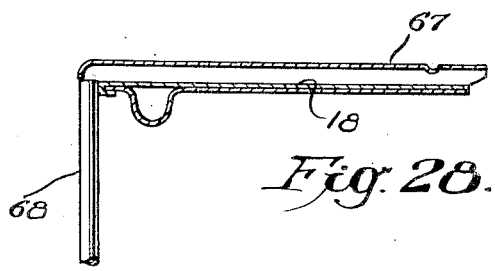

Fig. 27 is a fragmentary plan view of a burner assembly of the type shown in Figs. 1 to 18 and showing a further modification thereof; and Fig. 28 is a section on line 28—28 of Fig. 27.

Referring now to the drawings and more particularly to Figs. 1 to 11 thereof, the burner assembly comprises front burners 10 and 11 and rear burners 12 and 13, their associated burner tubes 14 and igniter tubes 15, and a pilot tube gas inlet duct 16 formed substantially in their entirety by complementary upper and lower unitary sheets 17 and 18. To produce this structure, the upper sheet 17 is embossed upwardly as at 19 to produce the burner top and the lower sheet 18 is embossed downwardly to produce the burner bottom 20. In order that the burner ducts 14 may have the proper level for communication with the gas outlets 21 of the manifold 22, the forward portions of both upper and lower sheets 17 and 18 are offset downwardly as at 23. At this offset forward portion, the upper portion 24 of the duct including its air inlet 25 is upwardly embossed from the upper sheet 17, and the lower portion 26 is downwardly embossed from lower sheet 18. As will be noted, the front burners 10 and 11 have their entire gas inlet ducts 14 formed in this manner. The portions of the gas inlet ducts of the rear burners lying rearwardly of the offset are formed by downwardly embossing the lower sheet as at 26a.

Centrally located between burners 10, 11, 12 and 13, and the sheets 17 and 18 is an aperture 27 formed in the sheets 17 and 18 upon which the igniter tubes 15 are concentered. These tubes are, in the main, and may be in their entirety, formed by embossing the upper sheet upwardly as at 28. In the present construction, the inner ends of these tubes are formed by an applied plate 29. The pilot burner supply tube 16 has, as in the case of the burner supply duct 14, the portion thereof forwardly of the offset 23, formed by embossing the upper sheet upwardly as at 30 and the lower sheet downwardly as at 31 and its rear portion formed entirely by embossing the lower sheet downwardly as at 31a. The pilot burner 32 is formed by complementary embossings provided in downwardly offset tongues 32a and 33 of the upper and lower sheets, respectively, and pressed therefrom in the formation of the opening 27.

Where space permits, the structure may be lightened by the removal of material of both the upper and lower plates, certain of the openings 34 thus formed being arranged in close proximity to the burners to insure an adequate amount of burner air therethrough. About the edges of the plates and about these openings, the plates are preferably sealed to one another by reverting the edges of the metal of the upper plate about the edge of the lower plate as indicated at 35. Adjacent the edges of the burners or ducts which are not defined by such seals, the plates are stitch-welded as at 36, such securing means proving entirely adequate to insure against leakage at the very low pressures at which the gas is supplied to the domestic range. The burner tops may be of any suitable design. In the form shown in Figs. 1 to 11, the upper surface of the burner top is shown with an annular series of openings 43 which register with corresponding openings 44 in a burner cap 45.

In Figs. 12 to 17, inclusive, I have illustrated a slight modification of the structure shown in Figs. 1 to 11. In this form of the invention, the igniter tubes 37 are formed in their entirety by embossing the upper sheet 18' upwardly and the lower sheet 17' functions merely to provide a flat bottom for the tubes 37. The pilot tube 38 is in the form of an entirely separate tube having an upturned rear end 39 extending through an opening in the bracket 40, which opening serves to guide the tube against displacement. Displacement is further prevented and the vertical level of the tube controlled by engagement of the horizontal run of the tube 38 adjacent its rear end in a notch 41 formed in the lower end of a flange 42 depending from bracket 40.

In the form shown in Figs. 12 to 14, inclusive, the burner top has an annular series of slots 46 in the burner cap 47 and comprises a flanged cup 48 adapted to seat in the depressed center of the burner top. The flange of the cup has the under surface thereof provided with radial serrations 49 through which gas may flow, and is further provided at its junction with the body of the cup with an annular series of outlet ports 50. Obviously these burner tops may be interchangeably employed in either of the constructions discussed.

In Figs. 18 to 26, inclusive, I have illustrated an adaptation of this assembly which includes the range top. For the purpose of illustration, this has been shown as a four burner top although obviously it may be readily adapted to a range top having any desired number of burners. In the construction illustrated, the numeral 51 designates an upper plate which has its surface downwardly embossed to form a plurality of burner wells 52, the side walls of which are shouldered as at 53 to form seats for the conventional grids 54 and the bottom walls of which are embossed upwardly as at 55 to form burner tops.

The burner tops are grouped in right and left hand pairs, each pair having associated therewith a bottom plate 56 having embossed therein burner bottoms 57 complementary to the burner tops 55 of the associated pair of plates 51. Plates 56 are further embossed downwardly to provide burner ducts 58 and 59 leading respectively to the front and rear burners of the associated pair. The ducts 59 must bridge the channels 60 between the front and rear burners formed by the wells 52 and for this reason, bridge plates 61 are provided closing the upper surface of the rear burner ducts 59 for a distance slightly in excess of the width of channels 60. The edges of rear plates 56 are suitably sealed to the upper plate and to the associated bridge plate 61 in any suitable manner, as for example, stitch-welding at 62.

The upper plate 51 is centrally provided with ports 63 to provide for the escape of combustion gases from pilot burner 66. The igniter tubes 64 for the several burners are formed by embossing the bottom walls of the wells 52 upwardly to provide the top half of such tubes. The bottoms of these igniter tubes and the inner ends thereof are formed by a cruciform element 65 attached to the under surface of upper plate 51. The pilot burner 66 and its supply duct 66a are preferably rigidly attached to the upper plate 51.

In many instances it may be desirable to provide such a unit with a flash tube for the lighting of associated burners such, for example, as an oven burner or the like. It will be obvious that the form of the invention shown in Figs. 12 to 26 is admirably adapted for the addition of such a flash tube as shown in Figs. 27 and 28. In these figures, the top plate 18 has secured thereto a channel tube 67 which extends from the pilot opening of the plate to an edge thereof and may project as far as it is desired beyond this edge. This tube may communicate at its outer end with an extension flash tube 68 from such other burner or burners and may obviously be added to the structure very readily and at a very low cost. As many such additional tubes may be provided as is desired.

Since the constructions are obviously capable of considerable modification without departing from the spirit of my invention, I do not wish to be understood as limiting myself thereto except as hereinafter claimed.

I claim:

1. A burner assembly for gas stoves comprising complementary and securely connected upper and lower plates, the upper plate having a plurality of burner tops embossed therein, the lower plate having the burner bottoms formed therein, gas supply ducts to the burners formed in one of said plates, a pilot burner operatively associated with the burners, and igniter ducts for connecting the pilot burner and the first named burners having the upper portions thereof adjacent first named burners formed by arched passages provided in the upper plate.

2. A burner assembly for gas stoves comprising complementary and securely connected upper and lower plates, the upper plate having a plurality of burner tops embossed therein, the lower plate having burner bottoms formed therein and having embossed channels combining with the upper plate to form gas supply ducts to the burners, a pilot burner operatively associated with the burners, and igniter ducts for connecting the pilot burner and the first named burners having the upper portions thereof adjacent the first named burners formed by arched passages provided in the upper plate.

3. In a structure of the type described, an assembly comprising an upper plate embossed to form a plurality of burner tops, a lower plate embossed to form a plurality of complementary burner bottoms and having channels extending therefrom substantially to one edge of said lower plate, said lower plate being gas sealed to the upper plate about its edges and along said channels to provide a plurality of burners and gas supply ducts for said burners, said burner tops being formed in the bottoms of wells in the top plate.

4. In a structure of the type described, an assembly comprising an upper plate embossed to form a plurality of burner tops, a lower plate embossed to form a plurality of complementary burner bottoms and gas sealed to the upper plate about its edges to provide a plurality of burners and supply ducts for said burners, said burner tops being formed in the bottoms of wells in the top plate, the side walls of the wells having a grid-supporting ledge.

5. A burner assembly for gas stoves comprising complementary and securely connected upper and lower plates, the upper plate being recessed to form a plurality of wells each having a burner top embossed in the central portion of the bottom thereof, the lower plate forming the burner bottoms, and gas supply ducts to the burners.

6. A burner assembly for gas stoves comprising complementary and securely connected upper and lower plates, the upper plate being recessed to form a plurality of wells each having a burner top embossed in the central portion of the bottom thereof, the lower plate having the burner bottoms formed therein, gas supply ducts to the burners, a pilot burner operatively associated with the burners and igniter ducts for connecting the pilot burner and the first named burners having the upper portions thereof adjacent first named burners formed by arched passages at the lower surface of the upper plate.

7. A burner assembly for gas stoves comprising complementary and securely connected upper and lower plates, the upper plate having a plurality of burner tops embossed therein, the lower plate having the burner bottoms formed therein, gas supply ducts to the burners, a pilot burner operatively associated with the burners and igniter ducts for connecting the pilot burner and the first named burners having the upper portions thereof adjacent first named burners formed by arched passages at the lower surface of the upper plate, said pilot burner comprising mating offset sections of said upper and lower plates and a gas supply duct for said pilot burner comprising embossed sections of said upper and lower plates.

8. A burner assembly for gas stoves comprising complementary and securely connected upper and lower plates, the upper plate being recessed to form a plurality of wells each having a burner top embossed in the central portion of the bottom thereof, the lower plate having the burner bottoms formed therein, gas supply ducts to the burners, a pilot burner operatively associated with the burners and igniter ducts for connecting the pilot burner and the first named burners having the upper portions thereof adjacent first named burners formed by arched passages at the lower surface of the upper plate, said pilot burner comprising mating offset sections of said upper and lower plates and a gas supply duct for said pilot burner integrally connected to said upper and lower plates.

9. A burner assembly of the type described comprising a pair of embossed plates combining to produce a plurality of burners, flash tubes for said burners and supply ducts to the burners, said plates being secured together in gas-tight relation about their edges and about the edges of the burners, flash tubes and burner ducts, said plates having alined openings for reception of a pilot burner on which said flash tubes are concentered, and means secured to one of said plates and combining therewith to form a flash tube having one end at said opening and the other adjacent an edge of the assembly.

10. A burner assembly of the type described comprising a pair of embossed plates combining to produce a plurality of burners, flash tubes and supply ducts to the burners, said plates being secured together in gas-tight relation about their edges and about the edges of the burners, flash tubes and burner ducts, said flash tubes being concentered upon an opening formed in the assembly and means on the lower plate for supporting a pilot in accurate alinement with said opening.

11. A burner assembly for gas stoves comprising complementary and securely connected upper and lower plates, the upper plate having a plurality of burner tops embossed therein, the lower plate having burner bottoms formed therein, gas supply ducts for the burners formed in one of said plates, a pilot burner operatively associated with the burners, and igniter ducts for connecting the pilot burner and the first named burners having the upper portions thereof adjacent the first named burners formed by arched passages provided in the upper plate.

HENRY S. MINSTER.

REFERENCES CITED

The following references are of record in the file of this patent:

UNITED STATES PATENTS

| Number | Name | Date |
| --- | --- | --- |
| 927,825 | Willson | July 13, 1909 |
| 1,957,442 | Brumbaugh, et al. | May 8, 1934 |
| 2,232,482 | Schulz | Feb. 18, 1941 |
| 2,396,800 | Mills | Mar. 19, 1946 |
| 2,411,313 | Zimbelman, et al. | Nov. 19, 1946 |

FOREIGN PATENTS

| Number | Country | Date |
| --- | --- | --- |
| 4,546 | Great Britain | of 1901 |
| 115,182 | Germany | Nov. 29, 1900 |
| 417,359 | France | June 22, 1910 |